United States Patent
Glaumot

(10) Patent No.: US 9,623,729 B2
(45) Date of Patent: Apr. 18, 2017

(54) PLASTIC STIFFENING PANEL FOR A DOOR, COMPRISING A MOUNTING MECHANISM FOR A WINDOW LIFT SYSTEM

(71) Applicant: RENAULT s.a.s., Boulogne Billancourt (FR)

(72) Inventor: Olivier Glaumot, Forges les bains (FR)

(73) Assignee: RENAULT s.a.s., Boulogne Billancourt (FR)

(\*) Notice: Subject to any disclaimer, the term of this patent is extended or adjusted under 35 U.S.C. 154(b) by 0 days.

(21) Appl. No.: 14/654,695

(22) PCT Filed: Feb. 11, 2014

(86) PCT No.: PCT/FR2014/050257
§ 371 (c)(1),
(2) Date: Jun. 22, 2015

(87) PCT Pub. No.: WO2014/125203
PCT Pub. Date: Aug. 21, 2014

(65) Prior Publication Data
US 2015/0336447 A1  Nov. 26, 2015

(30) Foreign Application Priority Data
Feb. 13, 2013  (FR) ...................................... 13 51206

(51) Int. Cl.
*B60J 5/04*  (2006.01)

(52) U.S. Cl.
CPC ........... *B60J 5/0456* (2013.01); *B60J 5/0402* (2013.01); *B60J 5/044* (2013.01); *B60J 5/045* (2013.01);
(Continued)

(58) Field of Classification Search
CPC ........ B60J 5/045; B60J 5/0465; B60J 5/0481; B60J 5/0484; B60J 5/0416
(Continued)

(56) References Cited

U.S. PATENT DOCUMENTS 4,769,951 A * 9/1988 Kaaden ................. B60J 5/0405
296/146.6
5,904,002 A * 5/1999 Emerling ............... B60J 5/0406
49/502
(Continued)

FOREIGN PATENT DOCUMENTS

EP  1 129 873  9/2001

OTHER PUBLICATIONS

French Search Report Issued Nov. 15, 2013 in French Patent Application No. 1351206 Filed Feb. 13, 2013.
(Continued)

*Primary Examiner* — Jason S Morrow
(74) *Attorney, Agent, or Firm* — Oblon, McClelland, Maier & Neustadt, L.L.P.

(57) ABSTRACT

A stiffening panel for a motor vehicle door, for example a side door. The stiffening panel is arranged between a structure of the door, which structure can be made of plastic, located on a side of a passenger compartment of the vehicle and configured to absorb majority of external impacts on the door, in particular front and side impacts on the side door, and at least one decorative outer panel which can be made of plastic and mounted on the structure. The stiffening panel can be made from a plastic material and stiffen the decorative outer panel to enable the outer panel to withstand external impacts on the door from the opposite side of the passenger compartment. The stiffening panel includes mounting elements for a window lift system. The stiffening panel is arranged between the decorative outer panel and a
(Continued)

window supported by the window lift system mounted on the stiffening panel.

12 Claims, 4 Drawing Sheets

(52) U.S. Cl.
CPC ............ B60J 5/0463 (2013.01); B60J 5/0469 (2013.01); B60J 5/0481 (2013.01); *Y10T 428/24008* (2015.01)

(58) Field of Classification Search
USPC .................. 296/146.5, 146.6, 146.7; 49/502
See application file for complete search history.

(56) References Cited

U.S. PATENT DOCUMENTS

| | | | | |
|---|---|---|---|---|
| 5,924,760 | A * | 7/1999 | Krajewski | B21D 13/00 296/146.5 |
| 7,125,067 | B2 * | 10/2006 | Bonnett | B60J 5/0416 296/146.5 |
| 2002/0007598 | A1 | 1/2002 | Nishikawa et al. | |
| 2003/0097798 | A1 * | 5/2003 | Staser | B60J 5/0416 49/502 |
| 2004/0098922 | A1 * | 5/2004 | Nakagawa | B60J 5/0416 49/502 |
| 2004/0217623 | A1 | 11/2004 | Chernoff et al. | |
| 2007/0062123 | A1 * | 3/2007 | Kruger | B60J 5/0416 49/502 |
| 2007/0220811 | A1 * | 9/2007 | Flendrig | B60J 5/0416 49/352 |
| 2007/0267889 | A1 * | 11/2007 | Flendrig | B60J 5/0416 296/146.6 |
| 2012/0036780 | A1 * | 2/2012 | Pleiss | B60J 5/0416 49/70 |

OTHER PUBLICATIONS

International Search Report Issued Dec. 23, 2014 in PCT/FR2014/050257 Filed Feb. 11, 2014.

* cited by examiner

PLASTIC STIFFENING PANEL FOR A DOOR, COMPRISING A MOUNTING MECHANISM FOR A WINDOW LIFT SYSTEM

TECHNICAL FIELD

The invention relates to the field of stiffening panels for motor vehicle doors, in particular for motor vehicle side doors.

The subject of the invention is also a motor vehicle door, in particular a motor vehicle side door, comprising such a stiffening panel. The invention further relates to a method for assembling such a motor vehicle door.

PRIOR ART

In the field of motor vehicles, the weight of the vehicle is a significant factor, in particular in terms of fuel consumption and pollution. This problem of weight-saving affects, in particular, the doors of the vehicle, in particular the side doors, whether they are articulated on the body or slidably mounted.

The mounting of a window and a window lift system represents a considerable problem within this context of weight optimization. Conventionally, in a side door which is generally produced from metal material, i.e. from steel or aluminum, the window lift system is fixed in a door cassette arranged on the side of the wooden veneer elements, i.e. on the side of the passenger compartment relative to the structure of the door.

The existing solutions are thus able to be improved in terms of weight, complexity and space requirement due to the choice of materials and use of parts designed for fixing the window lift system to the remainder of the door. Moreover, the assembly of the door is awkward given the manner of fixing the window lift system.

SUBJECT OF THE INVENTION

The object of the present invention is to propose a solution for a motor vehicle door, in particular for a side door, which remedies the drawbacks cited above.

In particular, the invention provides a solution which permits the weight of the door to be optimized, the design of the door to be simplified and the assembly of the door to be facilitated, while improving the capacity of the vehicle by reducing the bulk of the door.

These objects may be achieved by a stiffening panel for a motor vehicle door, in particular for a motor vehicle side door, designed to be interposed between, on the one hand, a structure of the door, in particular made of plastics material, arranged on the side of a passenger compartment of the vehicle and configured so as to absorb the majority of external impacts applied to the door, in particular the front and side impacts applied to the side door and, on the other hand, at least one decorative outer panel, in particular made of plastics material, fixed to said structure, said stiffening panel being formed in a plastics material and configured so as to provide a stiffness to said decorative outer panel relative to external impacts applied to the door on the side opposing the passenger compartment and comprising fixing elements, on said stiffening panel, for a window lift system, the stiffening panel being designed to be interposed between the decorative outer panel and a window carried by said window lift system fixed to the stiffening panel.

Advantageously, the stiffening panel may be formed in a thermoplastic material.

Said fixing elements may advantageously comprise:
mounting elements, on the stiffening panel, for a guide means belonging to said window lift system and providing guidance to a window of the door between a lowered position and a raised position,
and/or mounting elements, on the stiffening panel, for at least one means for raising and lowering the window, belonging to said window lift system and providing a displacement of the window between the lowered position and the raised position.

The mounting elements of at least one means for raising and lowering the window preferably comprise:
assembly elements, on said stiffening panel, for at least one support which is designed to cooperate with the window and which is displaceable relative to said stiffening panel so as to vary the window between the raised and lowered positions,
assembly elements, on said stiffening panel, for at least one stop limiting the path of said at least one support,
assembly elements, on said stiffening panel, for at least one cable for the displacement of the support,
assembly elements, on said stiffening panel, for a motor setting in motion said at least one cable,
and possibly assembly elements, on said stiffening panel, for at least one pulley for guiding said at least one cable during the movement thereof.

The stiffening panel may comprise fixing elements, on said stiffening panel, for a control module for the external opening of the door and/or a lock support designed to implement the closure of the door relative to a motor vehicle body provided with said door.

A motor vehicle door, in particular a motor vehicle side door, may advantageously comprise:
a structure, in particular made of plastics material, configured so as to absorb the majority of external impacts applied to the door, in particular the front and side impacts applied to the side door,
at least one decorative outer panel, in particular made of plastics material, fixed to said structure on the side opposing a passenger compartment closed by the door,
such a stiffening panel arranged between the structure and said at least one decorative outer panel and providing a stiffness to said decorative outer panel relative to external impacts applied to the door on the side opposing the passenger compartment,
a window guided on said stiffening panel,
a window lift system fixed to the stiffening panel.

It is conceivable that the stiffening panel is interposed between the window and said at least one decorative outer panel.

The door preferably comprises:
a guide means mounted on said stiffening panel belonging to said window lift system and providing guidance to the window between a lowered position and a raised position,
and/or at least one means for raising and lowering the window, mounted on the stiffening panel, belonging to said window lift system and providing a displacement of the window between the lowered position and the raised position.

The means for raising and lowering the window may comprise:
at least one support assembled to the stiffening panel, cooperating with the window and displaceable relative to said stiffening panel so as to vary the window between the raised and lowered positions, at least one stop assembled to the stiffening panel and limiting the path of said at least one support, at least one cable for displacing the support and assembled to the stiffening panel, a motor assembled to the stiffening panel and setting in motion said at least one cable, and possibly at least one pulley for guiding said at least one cable during the movement thereof and assembled to the stiffening panel.

The structure and/or the stiffening panel and/or the decorative outer panel may be assembled together by welding, in particular of the ultrasonic or laser type, and/or by adhesive bonding and/or by screwing and/or by clipping and/or by riveting and/or by snap riveting.

The structure may comprise, on the one hand, an internal lining made of plastics material and arranged, depending on the thickness of the door, on one side of the structure designed to be oriented toward the passenger compartment of the vehicle and, on the other hand, an external structural reinforcement made of plastics material and arranged, depending on the thickness of the door, on a side of the structure opposing the passenger compartment relative to the internal lining, the internal lining and the external structural reinforcement being configured and assembled together so as to delimit relative to one another a hollow body providing the strength of the structure relative to external impacts.

A method for assembling a motor vehicle door, in particular a motor vehicle side door, preferably comprises the following successive steps:

a step of providing such a stiffening panel, a step of fixing, to said stiffening panel, a window lift system, a step of premounting a window on a guide means belonging to said window lift system, a step of assembling the unit comprising said window and said stiffening panel, as a result of the step of premounting, with:
   a structure, in particular made of plastics material, configured to absorb the majority of external impacts applied to the door, in particular the front and side impacts applied to the side door,
   and/or with at least one decorative outer panel, in particular made of plastics material, fixed to said structure on the side opposing a passenger compartment closed by the door, so that said stiffening panel is arranged between the structure and said at least one decorative outer panel and provides a stiffness to said decorative outer panel relative to external impacts applied to the door.

BRIEF DESCRIPTION OF THE DRAWINGS

Further advantages and features will emerge more clearly from the following description of particular embodiments of the invention provided by way of non-limiting example and shown in the accompanying drawings, in which.

DESCRIPTION OF PREFERRED EMBODIMENTS OF THE INVENTION

Figure 1:
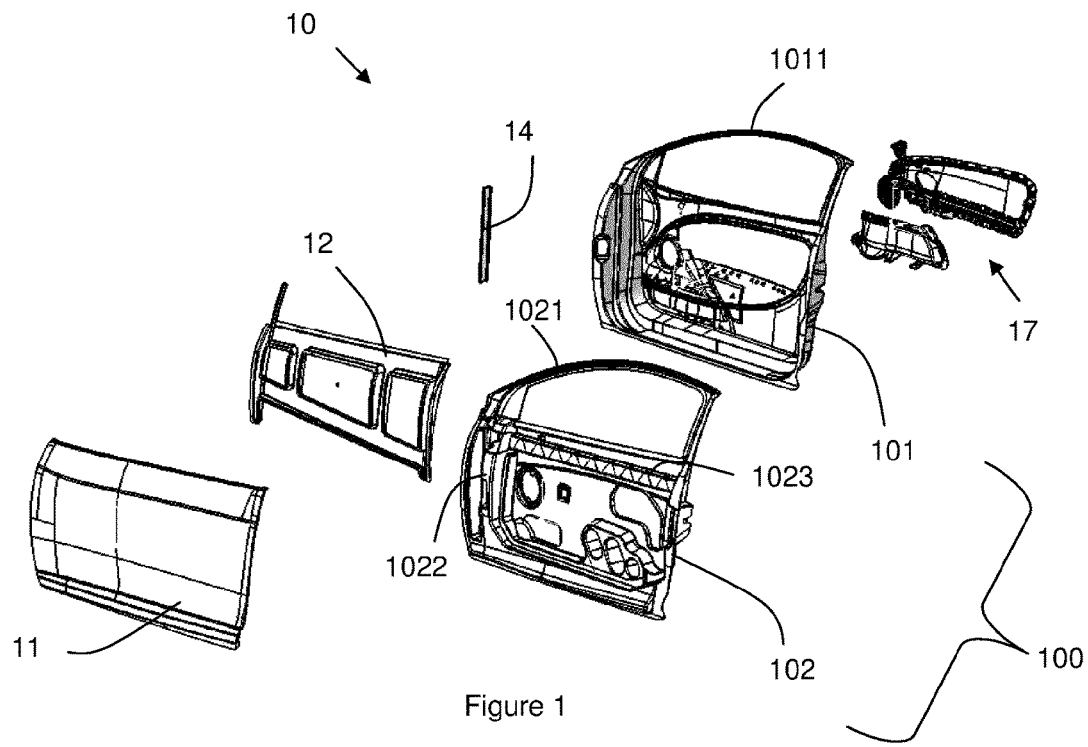
FIG. 1 is a perspective exploded view of the assembly of a motor vehicle side door comprising an example of the stiffening panel according to the invention.

The invention will be described hereinafter with reference to the accompanying FIGS. 1 to 7 which show an example of a motor vehicle door 10 according to the invention and comprise an example of a stiffening panel 12 of the door 10 according to the invention. FIGS. 1 to 7 relate to the particular case, which is non-limiting but is particularly targeted by the invention, of a door 10 consisting of a motor vehicle side door. However, this door 10 may be formed by another type of door.

More specifically, the motor vehicle door 10, in particular in this case the side door according to the illustrated embodiment, comprises at least one decorative outer panel 11, a structure 100 on which said at least one outer panel 11 is fixed on the side opposing the passenger compartment designed to be closed by the door 10, in addition to at least one stiffening panel 12 described below, fixed to the structure 100 and/or to the outer panel 11 and arranged between the outer panel 11 and the structure 100.

The term "structure" used in this document refers to the element of the door 10 which is designed to absorb the large majority of forces resulting from external impacts applied to the door 10. Thus, a considerably smaller portion of said forces may still be intended to be absorbed by other elements of the door 10 independently of the structure 100, in particular the decorative outer panel 11 and the stiffening panel 12. This stiffening panel 12 is configured to provide a stiffness to the decorative outer panel 11 relative to external impacts applied to the door 10 on the side opposing the passenger compartment, in addition to that provided by the structure 100. The stiffness provided to the door 10 by means of such a stiffening panel 12 is thus added to the properties of stiffness, robustness and absorption of impacts provided to the door 10 by the structure 100. The structure 100 is, in particular, made of plastics material for weight-saving reasons and ease of recycling of the door 10 and it is arranged on the side of the passenger compartment of the vehicle. Similarly, said at least one decorative outer panel 11 is advantageously made of plastics material for the same reasons.

According to an essential feature, the stiffening panel 12 is formed in a plastics material and comprises fixing elements, on said stiffening panel 12, for a window lift system. It is conceivable, in particular, that the stiffening panel 12 is assembled to the remainder of the door 10 such that the stiffening panel 12 is interposed between the decorative outer panel 11 and the window 13 carried by the window lift system which is in turn fixed to the stiffening panel 12.

This feature is interesting as, in the lowered position, the window 13 is then located toward the outside of the door relative to the structure 100. Apart from the specific fixing of the window 13 on the stiffening panel 12 this may require a specific shape to be provided to the window 13.

An advantage of this feature is to permit as much space as possible to be freed in the structure 100 of the door 10, which makes it possible to reduce the thickness of the structure 100, in particular in the region of the internal lining 101 belonging to the structure 100 and which may also be denoted the "shell", and not to restrict the capacity provided by the door 10 on the internal side oriented toward the passenger compartment.

The advantage of integrating the window lift system in the stiffening panel 12 is to use the material of a part which already exists and which is necessary. This therefore advantageously provides an additional function to the stiffening panel 12. Thus, the total weight of the door 10 is optimized and the design of the assembly is simple by using a reduced number of parts necessary for mounting the window lift system. The saving in weight of the solution disclosed here relative to existing solutions has been estimated to range between approximately 500 g and 1 kg.

Advantageously, the stiffening panel 12 is formed in a thermoplastic material, for example a polypropylene or polyamide matrix.

The structure 100 of the door 10 comprises an internal lining 101 and an external structural reinforcement 102, both essentially formed in a plastics material. The plastics material used to form the internal lining 101 may be identical to or different from that in which the external structural reinforcement 102 is formed. According to the direction corresponding to the thickness of the structure 100 (which corresponds to the direction of the thickness of the door 10 generally designed to be oriented in the transverse horizontal direction of the vehicle in the case of a side door when said door is closed relative to the body of the vehicle) the internal lining 101 is arranged on one side of the structure 100 designed to be oriented in the direction of the passenger compartment of the vehicle. In contrast, the external structural reinforcement 102 is arranged, depending on the thickness of the structure 100, on one side of the structure 100 opposing the passenger compartment of the vehicle relative to the internal lining 101. In other words, the external structural reinforcement 102 is oriented in the direction of the exterior of the vehicle toward the stiffening panel 12 and the decorative outer panel 11 in a direction opposing the direction toward the passenger compartment.

The internal lining 101 and the external structural reinforcement 102 are configured (which corresponds to a definition of the size, the spatial layout and the shapes of these two elements) and assembled together so as to delimit relative to one another a hollow body providing a strength (stiffness, robustness, energy absorption property) of the door 10 relative to external impacts, in particular front and side impacts applied to the door 10 when it consists of a side door. By "hollow body" it is understood that the internal lining 101 and the external structural reinforcement 102 delimit relative to one another an internal volume denoted "V" (FIG. 5) of the shell or cavity type, and that this volume V is closed or partially open to the outside. This peripheral hollow body of the door 10 largely contributes to the stiffness of the assembly and makes it possible to meet the required performance specification of a door 10, in particular a side door. As a result, this preassembled structure 100 supports the large majority or even all of the mechanical force inputs and outputs to which a door, in particular a side door, is subjected.

While the current techniques incorporate reinforcements made of metal material (steel or aluminum) in the side doors to guarantee the benefits thereof, generally assembled by overmolding, the solution described here makes it possible to save weight due to the use of plastics materials while providing the mechanical properties required for the function of the door 10 by means of the arrangement of the hollow body delimited by the structure 100.

Figure 6:
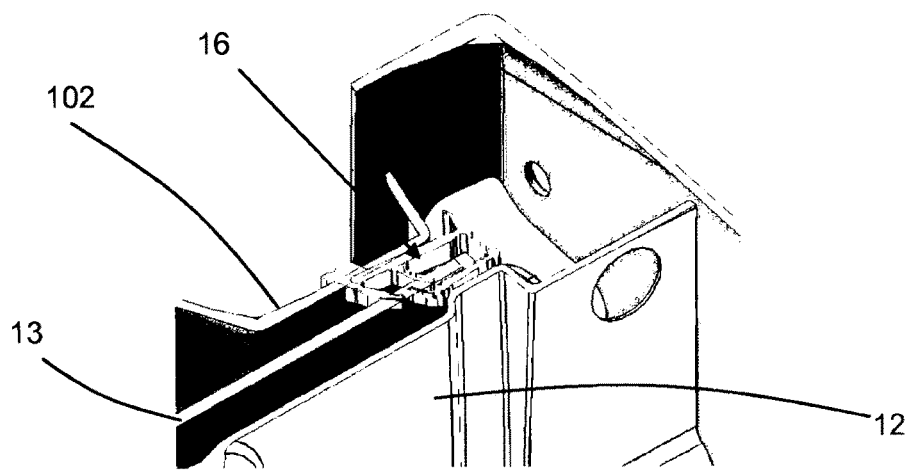

Advantageously, the hollow body delimited by the external structural reinforcement 102 and the internal lining 101 assembled together is closed over the entire periphery of the door 10. This may be obtained by providing a continuous contact of the internal lining 101 against the external structural reinforcement 102 over the full periphery of the door 10 in the entire lower part of the door 10, the window 13 being arranged in the region thereof in its lowered position, and in the entire upper part of the door forming a frame enclosing the window 13 when it occupies its raised position. This may, for example, be a continuous welding strip arranged over the entire peripheral contour of the internal lining 101, even in the region of the frame 1011 of the internal lining 101 which encloses the window 13 in the raised position. These features do not exclude the fact that the hollow body may be open in a central part of the door 10, in particular in the vicinity of the connection between said lower and upper parts of the door 10 where, for example, mounting elements 1023 of a reinforcing strip 15 of the door 10 are arranged on the external structural reinforcement 102. FIG. 6 illustrates, in particular, that the hollow body extends continuously, even on the uprights of the door 10 in its upper part, i.e. along the uprights of the frame 1011 delimited by the upper part of the internal lining 101 and the uprights of the frame 1021 delimited by the upper part of the reinforcement 102 and placed opposite and remotely from the uprights of the frame 101 to delimit locally said hollow body on the upper periphery of the door 10. This feature is extended on the upper crossmember of the door 10 connecting the uprights of the door 10. Similarly, in the lower part of the door 10, the internal lining 101 and the reinforcement 102 are placed opposite and remotely from one another so as to delimit locally said hollow body on the lower periphery of the door 10.

The external structural reinforcement 102 may advantageously comprise mounting elements 1022, on the external structural reinforcement 102, for articulation elements 14 (of the hinge type) designed to articulate the door 10 on a body of a vehicle comprising the door 10.

The fixing elements which permit the fixing of the window lift system on the stiffening panel 12 comprise:

mounting elements, on the stiffening panel 12, for a guide means 16 (FIG. 2) belonging to said window lift system and providing guidance to the window 13 of the door 10 between the lowered position (FIG. 3) and the raised position (FIG. 4), and/or mounting elements, on the stiffening panel 12, for at least one means for raising and lowering 17 the window (FIG. 3) belonging to said window lift system and providing a displacement of the window 13 between the lowered position and the raised position.

Each guide means 16 may be in the form of a guide rail, two guide rails which are substantially vertical and parallel to one another being, for example, offset relative to one another along the width of the window 13 in the lower part of the door 10.

Thus, the door 10 comprises a guide means 16 mounted on the stiffening panel 12, belonging to said window lift system fixed to the stiffening panel 12 and providing guidance to the window 13 between the lowered and raised positions and/or at least one means for raising and lowering 17 the window mounted on the stiffening panel 12, belonging to said window lift system fixed to the stiffening panel 12 and providing a displacement of the window 13 between the lowered and raised positions.

The mounting elements of at least one means for raising and lowering 17 the window comprise:

assembly elements, on said stiffening panel 12, for at least one support 171 (FIG. 3) which is designed to cooperate with the window 13 and which is displaceable relative to said stiffening panel 12 so as to vary the window 13 between the raised and lowered positions, assembly elements, on said stiffening panel 12, for at least one stop (not shown) limiting the path of said at least one support 171 in the lower part and/or in the upper part of said path, assembly elements, on said stiffening panel 12, for at least one cable (not shown) for the displacement of each support 171, assembly elements, on said stiffening panel 12, for a motor 172 setting in motion said at least one cable, and possibly assembly elements, on said stiffening panel 12, for at least one pulley (not shown) for guiding said at least one cable during the movement thereof.

As a result of these arrangements, the means for raising and lowering 17 the window comprises:

at least one support 171 assembled to the stiffening panel 12, cooperating with the window 13 and displaceable relative to the stiffening panel 12 so as to vary the window 13 between the raised and lowered positions, at least one stop (not shown) assembled to the stiffening panel 12 and limiting the path of the support 171, at least one cable (not shown) for displacing the support 171 and assembled to the stiffening panel 12, a motor 172 assembled to the stiffening panel 12 and setting in motion said at least one cable, and possibly at least one pulley (not shown) for guiding said at least one cable during the movement thereof and assembled to the stiffening panel 12.

Advantageously, each support 171 is designed to slide along a given path by being guided by the guide means 16. On the other hand, it is preferable to provide two supports 171 which are separate but are displaced synchronously, providing a lateral offset relative to one another along the width of the window 13.

In one embodiment, the stiffening panel 12 comprises fixing elements, on said stiffening panel 12, for a control module (not shown) for the external opening of the door 10 and/or a lock support (not shown) designed to implement a closure of the door 10 relative to the motor vehicle body provided with the door 10.

Figure 7:
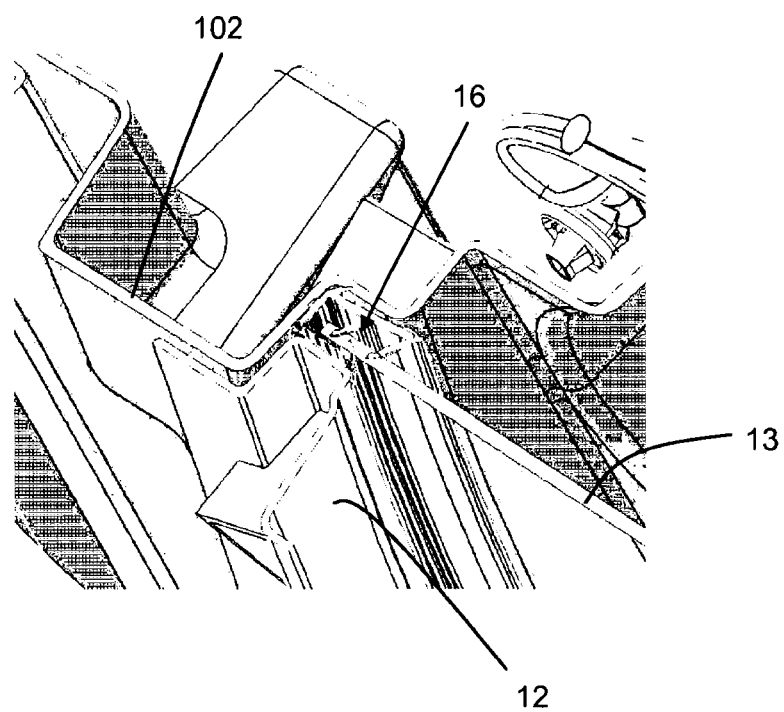

As a result of the above, the door 10 comprises a window 13 guided on the stiffening panel 12 and a window lift system fixed to the stiffening panel 12. The window 13 is advantageously interposed between the structure 100 (thus being located outside the structure 100) and the stiffening panel 12. More specifically, the window 13 is located between the external structural reinforcement 102 of the structure 100 and the stiffening panel 12. FIGS. 6 and 7 show these arrangements, respectively on the side of the rear lateral edge and on the side of the front lateral edge of the window 13.

Due to the arrangement of such a structure 100, of the stiffening panel 12 and of the decorative outer panel 11 in a plastics material, the structure 100 and/or the stiffening panel 12 and/or the decorative outer panel 11 are assembled together by welding, in particular of the ultrasonic or laser type, and/or by adhesive bonding. Alternatively or in a combined manner, the fixing may still be carried out by screwing and/or by clipping and/or by riveting and/or by snap riveting.

This principle of a stiffening panel 12 made entirely of plastics material, in particular thermoplastics material, makes it possible to respect the principles of recycling plastics parts. This solution may enable weight to be saved, therefore, relative to a conventional solution made of sheet steel without compromising the benefits of recycling.

The assembly of a motor vehicle door 10, in particular of a motor vehicle side door, is carried out in the following manner.

Figure 2:
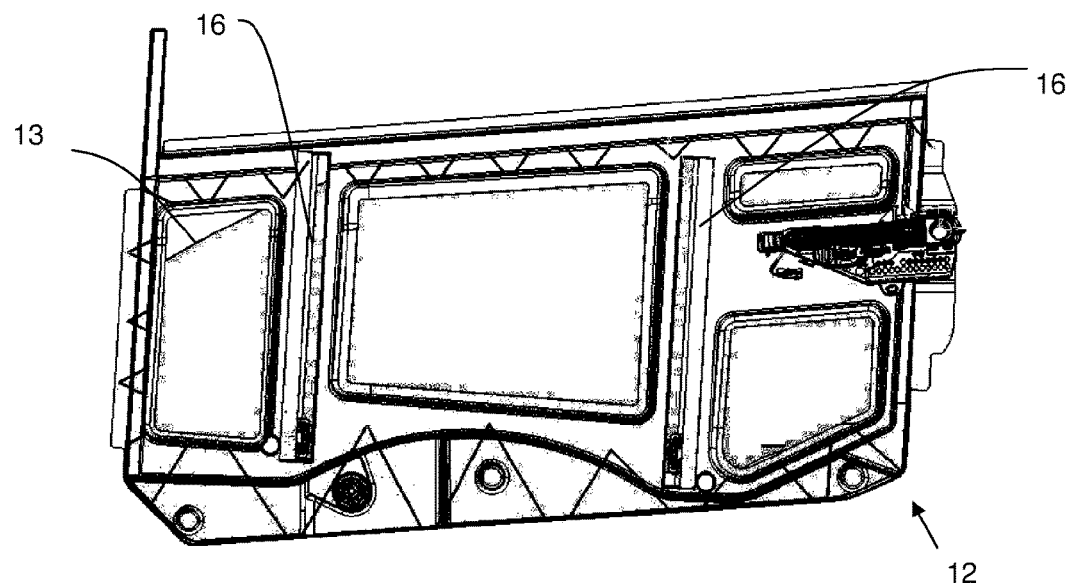
FIGS. 2 and 3 are views of the premounted assembly formed by the stiffening panel, the window and the window lift system, respectively on the external side and the internal side of this assembly.
Figure 3:
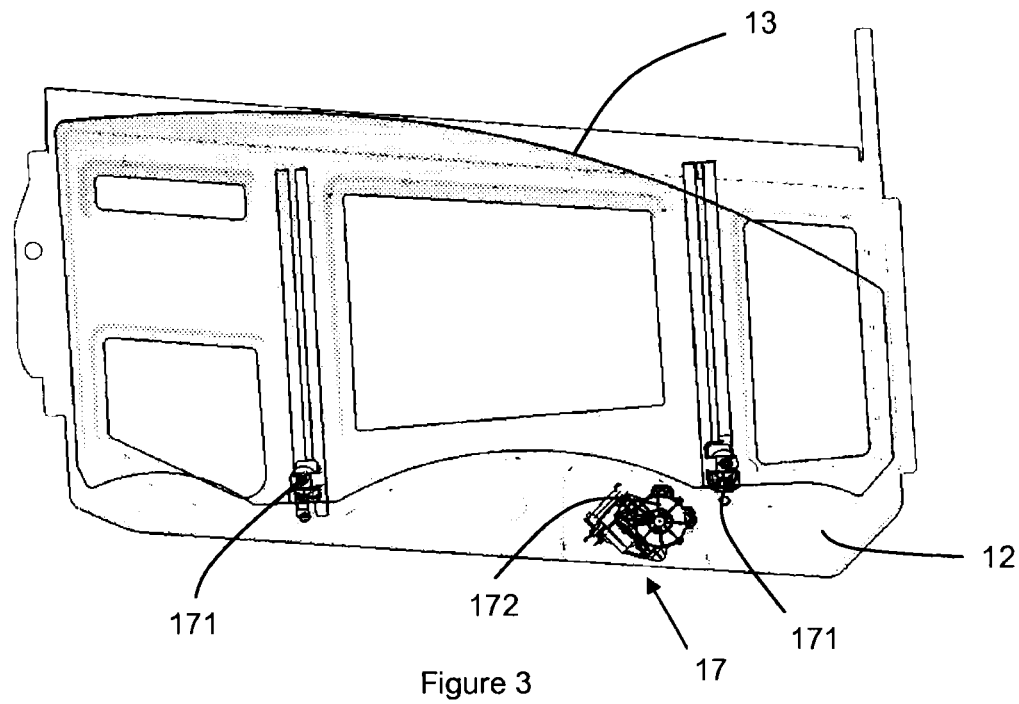
Figure 4:
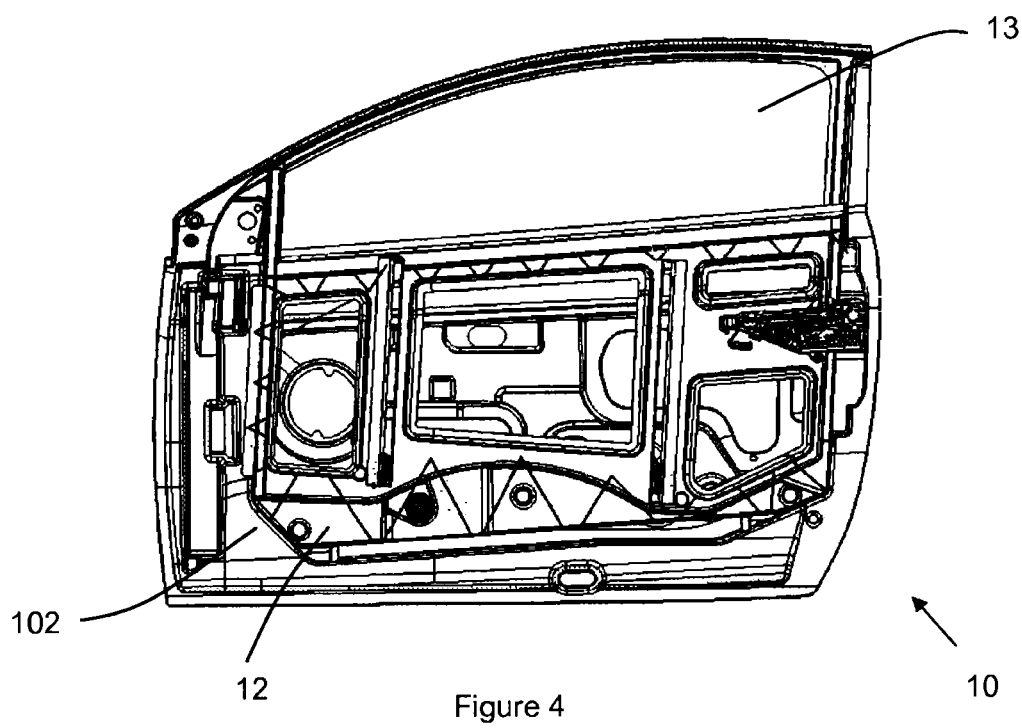
FIG. 4 is a view from the internal side of the side door.
Figure 5:
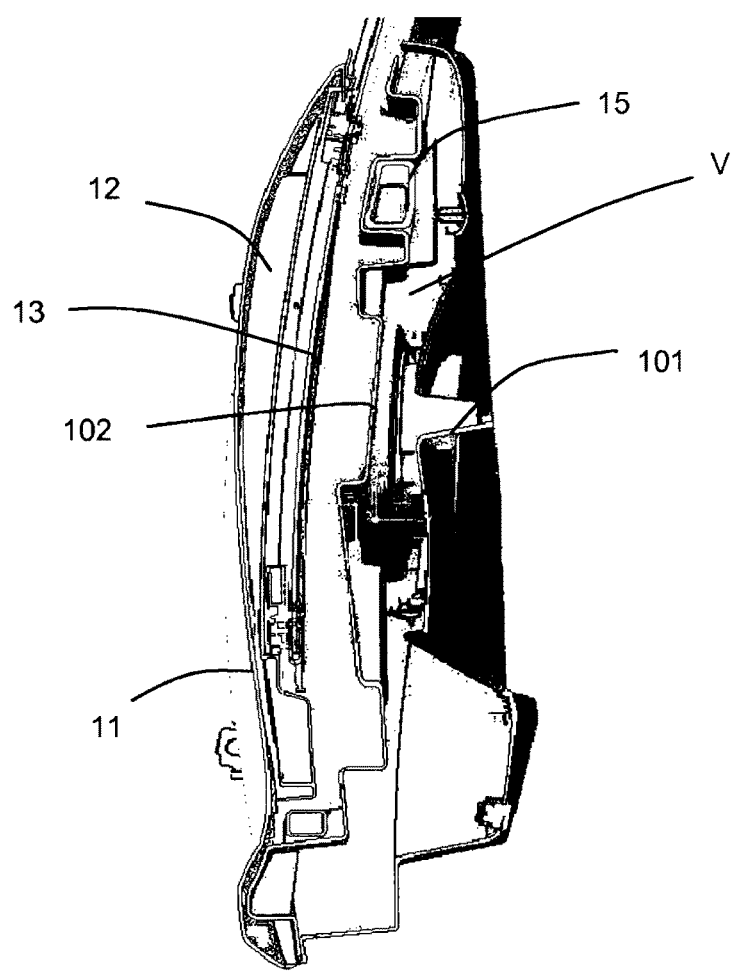
FIG. 5 is a view in transverse vertical section of the side door of FIG. 1, FIGS. 6 and 7 each illustrate the external structural reinforcement on which the premounted assembly of FIGS. 2 and 3 is mounted, along a horizontal section.

In a first step, it is necessary to provide such a stiffening panel 12, then a window lift system is fixed to the stiffening panel. Finally, a window 13 is premounted on a guide means 16 belonging to the window lift system previously fixed to the panel 12. This has the result of forming a premounted assembly consisting of the stiffening panel 12, the window 13 and the window lift system. This premounted assembly is shown in FIGS. 2 and 3, respectively from the outside and from the inside of said assembly.

It is possible with this principle to create a module consisting of the assembly formed by the stiffening panel 12, by the window lift system and by the window 13 assembled together, resulting from said step of premounting. This makes it possible to implement a very simple assembly of the door 10.

More specifically, the remaining assembly of the door consists very simply in assembling the unit comprising the window 13 and the stiffening panel 12, as a result of the premounting described above, with the structure 100 and/or with at least one decorative outer panel 11.

It is also conceivable, in a frameless door design, to carry out an adjustment of the window 13 and of the window lift system directly on the stiffening panel 12 between the premounting and final assembly to the structure 100 and/or to the decorative outer panel 11. This results in a simplification of the mounting and adjustment of the door 10 and the window lift system.

Moreover, as the decorative outer panel 12 is mounted last on the outside of the door 10, the solution described in this document makes it possible to mount the constituent parts of the door 10 from the outside and thus to provide an internal lining 101 which partially or entirely provides the function of an internal lining while incorporating the principal sealing strip relative to the body.

The invention claimed is:

1. A stiffening panel for a motor vehicle door comprising:
fixing elements, on the stiffening panel, for a window lift system,
wherein the stiffening panel is configured to be interposed between a structure of the door and at least one decorative outer panel, made of plastics material, fixed to the structure,
wherein the structure of the door is made of plastics material, arranged on a side of a passenger compartment of a vehicle relative to the stiffening panel and the decorative outer panel, and configured to absorb a majority of external impacts applied to the door,
wherein the stiffening panel being formed in a plastics material and configured to provide a stiffness to the decorative outer panel relative to external impacts applied to the door on the side opposing the passenger compartment and comprising fixing elements, on the stiffening panel, for a window lift system,
wherein the stiffening panel is configured to be interposed between the decorative outer panel and a window carried by the window lift system fixed to the stiffening panel, and wherein the stiffening panel is configured to be arranged on the side of the passenger compartment relative to the decorative outer panel.

2. The stiffening panel as claimed in claim 1, formed in a thermoplastic material.

3. The stiffening panel as claimed in claim 1, wherein the fixing elements comprise:
mounting elements, on the stiffening panel, for a guide means belonging to the window lift system and providing guidance to a window of the door between a lowered position and a raised position, and
mounting elements, on the stiffening panel, for the window lift system and providing a displacement of the window between the lowered position and the raised position.

4. The stiffening panel as claimed in claim 3, wherein the mounting elements of the window lift system comprise:
assembly elements, on the stiffening panel, for at least one support configured to cooperate with the window and which is displaceable relative to the stiffening panel to vary the window between the raised and lowered positions;
assembly elements, on the stiffening panel, for at least one stop limiting a path of the at least one support;
assembly elements, on the stiffening panel, for at least one cable for displacement of the support;
assembly elements, on the stiffening panel, for a motor setting in motion the at least one cable; and
assembly elements, on the stiffening panel, for at least one pulley for guiding the at least one cable during movement thereof.

5. The stiffening panel as claimed in claim 1, further comprising fixing elements, on the stiffening panel, for a control module for external opening of the door and/or a lock support configured to implement closure of the door relative to a motor vehicle body provided with the door.

6. A motor vehicle door, or a motor vehicle side door, comprising:
a structure configured to absorb majority of external impacts applied to the door, or front and side impacts applied to the side door;
at least one decorative outer panel made of plastics material, fixed to the structure on a side opposing a passenger compartment closed by the door;
a stiffening panel as claimed in claim 1, arranged between the structure and the at least one decorative outer panel and providing a stiffness to the decorative outer panel relative to external impacts applied to the door on the side opposing the passenger compartment;
a window guided on the stiffening panel; and
a window lift system fixed to the stiffening panel.

7. The door as claimed in claim 6, wherein the stiffening panel is interposed between the window and the at least one decorative outer panel.

8. The door as claimed in claim 6, wherein the door comprises:
a guide means mounted on the stiffening panel belonging to the window lift system and providing guidance to the window between a lowered position and a raised position; and
at least one motor mounted on the stiffening panel belonging to the window lift system and providing a displacement of the window between the lowered position and the raised position.

9. The door as claimed in claim 8, wherein the window lift system comprises:
at least one support assembled to the stiffening panel, cooperating with the window and displaceable relative to the stiffening panel to vary the window between the raised and lowered positions;
at least one stop assembled to the stiffening panel and limiting a path of the at least one support;
at least one cable for displacing the support and assembled to the stiffening panel;
a motor assembled to the stiffening panel and setting in motion the at least one cable; and
at least one pulley for guiding the at least one cable during movement thereof and assembled to the stiffening panel.

10. The door as claimed in claim 6, wherein at least one of the structure, the stiffening panel, and the decorative outer panel are assembled together by at least one of welding, ultrasonic welding, laser type welding, adhesive bonding, screwing, clipping, riveting, and snap riveting.

11. The door as claimed in claim 6, wherein the structure comprises an internal lining made of plastics material and arranged, depending on thickness of the door, on one side of the structure configured to be oriented toward a passenger compartment of the vehicle and an external structural reinforcement made of plastics material and arranged, depending on thickness of the door, on a side of the structure opposing the passenger compartment relative to the internal lining, the internal lining and the external structural reinforcement being configured and assembled together to delimit relative to one another a hollow body providing strength of the structure relative to external impacts.

12. A method for assembling a motor vehicle door, or a motor vehicle side door, comprising:
providing a stiffening panel as claimed in claim 1;
fixing, to the stiffening panel, a window lift system;
premounting a window on a guide means belonging to the window lift system;
assembling the unit comprising the window and the stiffening panel as a result of the premounting, with:
a structure made of plastics material, configured to absorb majority of external impacts applied to the door, or front and side impacts applied to the side door; and
wherein at least one decorative outer panel made of plastics material, fixed to the structure on a side opposing a passenger compartment closed by the door, so that the stiffening panel is arranged between the structure and the at least one decorative outer panel and provides a stiffness to the decorative outer panel relative to external impacts applied to the door.

* * * * *